United States Patent [19]

Hagen et al.

[11] Patent Number: 4,836,019

[45] Date of Patent: Jun. 6, 1989

[54] COMPACT AIR DATA SENSOR

[75] Inventors: Floyd W. Hagen, Eden Prairie; Richard V. DeLeo, Hopkins, both of Minn.

[73] Assignee: Rosemount Inc., Eden Prairie, Minn.

[21] Appl. No.: 89,971

[22] Filed: Aug. 27, 1987

[51] Int. Cl.$^4$ ............................................. G01C 21/00
[52] U.S. Cl. ...................................... 73/180; 73/182; 73/861.65
[58] Field of Search ..................... 73/182, 180, 178 R, 73/861.65, 861.66, 861.67, 861.68

[56] References Cited

U.S. PATENT DOCUMENTS

| | | | |
|---|---|---|---|
| 2,984,107 | 5/1961 | Strieby et al. | 73/212 |
| 3,050,996 | 8/1962 | Henderson | 73/182 |
| 3,097,528 | 7/1963 | Mohring | 73/212 |
| 3,318,146 | 5/1967 | DeLeo et al. | 73/180 |
| 3,482,445 | 12/1969 | DeLeo et al. | 73/182 |
| 4,096,744 | 6/1978 | DeLeo et al. | 73/180 |
| 4,275,603 | 6/1981 | Kalocsay | 73/182 |
| 4,378,696 | 4/1983 | DeLeo et al. | 73/180 |

Primary Examiner—Donald O. Woodiel
Attorney, Agent, or Firm—Kinney & Lange

[57] ABSTRACT

An air data sensor comprising an elongated probe having a standard, sharped edge, orifice pitot port or opening, and a tapered leading end that is elongated with respect to its lateral dimensions along the longitudinal axis of the probe. The leading end portion blends into the main portion of the probe at a desired relatively short distance downstream from the pitot port. The probe comprises a tube or barrel that can be rectilinear or circular in cross section. Sets of sensing ports are utilizied and at least one pair of ports is oriented on a common axis and facing in opposite directions. Reliable sensing can be obtained when two sets of oppositely facing ports are used with the axis of each set 90° to the axis of the other set. By using the pressure sensed in more than one combination, that is by co-using the pressures, static pressure, impact pressure, angle of attack and angle of sideslip can be derived. The ports are positioned on the tapered forward section, rearwardly of the pitot port before the full size of the basic tube is reached, and are positioned very close to the leading end. The tapered forward section expands from the edge of the pitot port a short axial distance, not generally more than eight equivalent radii at the port location, and the ports are positioned greater than one and less than six equivalent radii aft of the pitot tip.

21 Claims, 9 Drawing Sheets

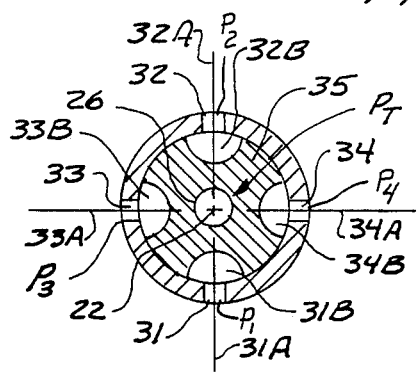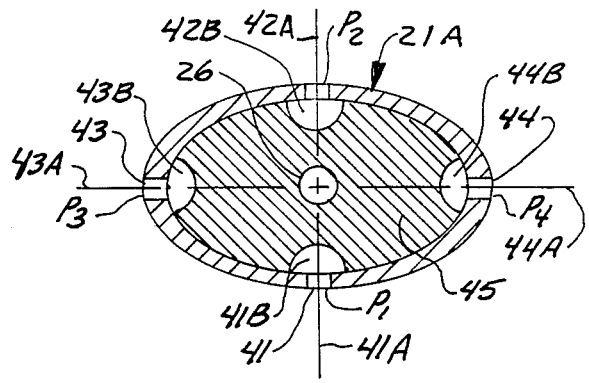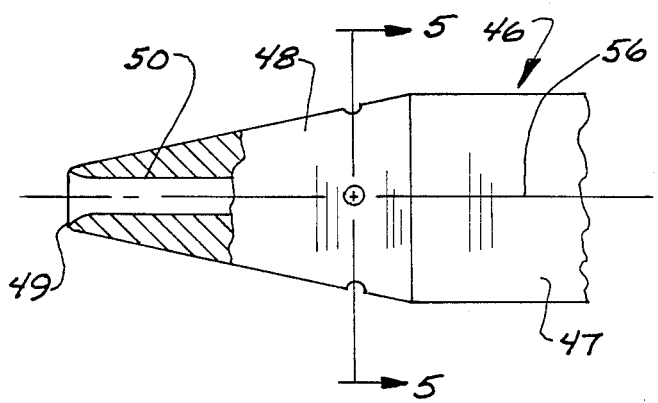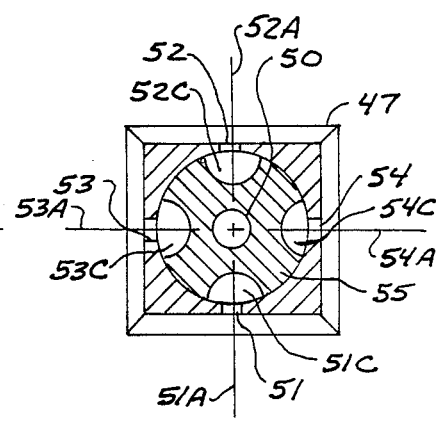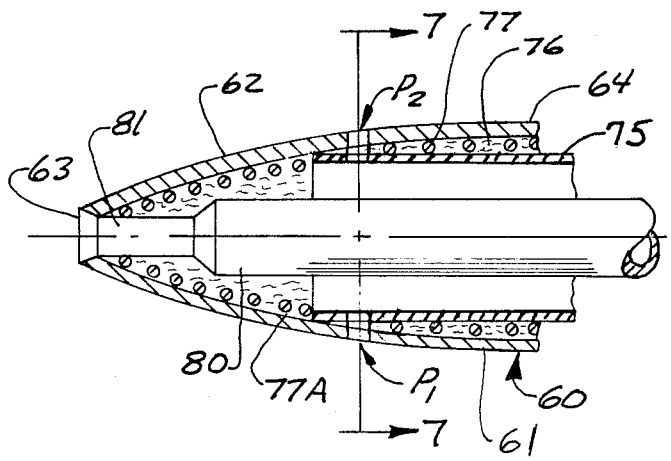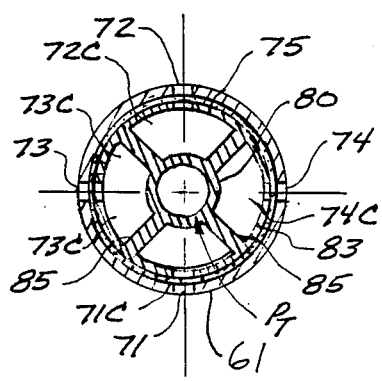

VELOCITY VECTOR NOTATION

COMPACT AIR DATA SENSOR

BACKGROUND OF THE INVENTION

1. Field of the Invention.

The present invention relates to air data sensing probes which provide needed pressure information for high performance air vehicles in a compact axially short probe.

2. Description of the Prior Art.

Generally speaking, air data sensors have pressure measuring ports that are spread over a substantial axial length in order to obtain pitot pressure, static pressure, and angle of attack and angle of sideslip outputs in a reliable manner. For example, U. S. Pat. Nos. 4,378,696 and 4,096,774 show such typical prior art sensors with the ports on the barrel or tube portion, spaced rearwardly from the leading tapered end, these probes also provide for surface irregularities or configurations that provide controlled pressure disturbances for compensation purposes.

Patent 4,378,696, in particular, is adapted for high angle of attack operation, which is very important in present air vehicles.

An air data sensing probe which utilizes five sensing ports on a hemispherical end is shown in U. S. Pat. No. 3,318,146. This probe works well for aircraft at moderately high angles of attack. The pitot pressure sensing port on the center of the hemispherical end senses a pressure that is substantially less than a true pitot or impact pressure, at high angles of attack. It is desirable to have a leading end on the probe that provides for a sharp edge pitot port for accurately sensing the pitot or impact pressure, which will continue to function reliably at high angles of attack.

SUMMARY OF THE INVENTION

The present invention relates to an air data sensor that can be either mounted on a boom ahead of an air vehicle, or can comprise an "L" shaped probe that is mounted on a strut along the side of a vehicle. The sensor includes a conventional, circular pitot port or orifice, formed at the leading end of a tapered leading section of a sensor. The leading section tapers from the main section of the barrel forwardly to the circular pitot opening. The tapered leading end section of the sensor preferably has four pressure sensing ports spaced closely downstream from the pitot port. The ports are arranged in two oppositely facing pairs of ports which are coaxial and opposite sides of the tapered leading section of the probe. The pressures from these four ports can be co-used, in order to determine static pressure, angle of attack, angle of sideslip, and also to provide impact pressure. Impact pressure is the difference between the pitot pressure and static pressure, and is used to determine calibrated air speed. The ratio of impact pressure to static pressure is used to determine Mach number. Differential pressures between sets of ports on opposite sides of the leading end of the probe are used for determining angle of attack and angle of sideslip.

With probes or sensors mounted adjacent to the side of an air vehicle, angle of sideslip is not measured so one pair of the ports is not actively used for angle measurement but the pressures sensed at that pair of ports are used for determining static pressure.

The present air data sensor operates over a wide range of flow angles, and it is not necessary to align the sensor longitudinal axis with the predominate or zero flow angle direction of the air vehicle. The sensor can be electrically de-iced and anti-iced, by conventional methods for all weather operation.

Internal manifolding in the sensor permits carrying the individual pressures to the base mounting plate of the probe, where the individual pressure signals are coupled to pressure sensors to provide the desired electrical output that can be used directly as indications of a desired pressure, but more commonly, to provide the pressure sensor output signals to a digital air data computer that has calibration derived compensation information for compensation of the outputs at different angles of attack or angles of sideslip.

When the sensor of the present invention is strut mounted on the side of the fuselage of an aircraft, the sensor will measure local angle of attack in a plane parallel to the fuselage surface and measurement of sideslip is not generally done.

If desired, extra ports can be added in the same or nearby cross section of the probe to provide separate static pressure and angle of attack sensing ports. The tapered leading end sections of the air data sensing probe can be non-circular, circular or rectilinear in cross section. Some non-symmetrical cross sections can be utilized to advantage where non-symmetrical pressure distributions are useful, for example, if the sensor needs a larger usable angle of attack range than angle of sideslip range.

A square tube probe can be used, for example, with a pyramidal leading end section that has planar sides which are inclined from the central axis of the sensor at between 10° and 30°. The main square tube forming the probe barrel can have sharp corners or rounded corners, and of course, the pressure calibration characteristics can be altered by using difference pyramid angles for the leading end section of the sensor and different positioning of the pressure sensing ports from the pitot port.

If desired, the sensor tube shape aft or downstream from the pressure sensing ports can be contoured to provide aerodynamic disturbances for compensation at a specific mounting location as shown in the prior patents mentioned above. The size of the tube or probe can be increased from its standard size and specific locations to give position pressure compensation or decrease to give a negative pressure compensation. The exact shape of the tube itself can be custom designed for a specific mounting location on an air vehicle.

The compact sensors shown herein can be used for measuring the local flow angle when mounted on L-struts where they are close to a fuselage surface. The sensor operate over a wide range of flow angles, for example, for angles of attack and sideslip the probes operate well at plus or minus 50°, and are useful at maximum ranges up to plus or minus 90° or more. One of the features of the present invention is that because the sensors can operate over a wide range of flow angles relative to the sensor axis, it is not necessary that the sensor axis be precisely aligned with the preferred flow angle direction of the aircraft.

The sensor made according to the present invention provides pressures from which many air data parameters can be derived, including the static pressure, impact pressure, angle of attack and angle of sideslip. The sensor of the present invention allows the determination of all of the needed air data parameters using a minimum number of sensing ports in a very compact probe and using a portion of the probe previously believed to be unreliable. By using the pressures from the individual ports in more than one application as desired, for obtaining different functions. The pressures at the respective ports are interdependent, and an iterative procedure may be used to obtain a final corrected air data parameter, if the configuration of the probe and the aircraft require it.

BRIEF DESCRIPTION OF THE DRAWINGS

FIG. 2 is a sectional view taken as on line 2—2 in FIG. 1;

FIG. 3 is a sectional view taken as on the same line as FIG. 2 with a different cross sectional configuration illustrated for the leading FIG. 4 is a partial side view of a leading end portion of a modified form of the invention utilizing a square probe barrel, and a pyramidal front portion with parts in section and parts broken away;

FIG. 5 is a sectional view taken as on line 5—5 in FIG. 4;

FIG. 6 is a cross sectional fragmentary view of a leading end portion of the probe of FIG. 1 showing an outer shell with an electrical heater therein;

FIG. 7 is a sectional view taken as on line 7—7 in FIG. 6 to illustrate a further modified form of the probe interior construction;

DETAILED DESCRIPTION OF THE PREFERRED EMBODIMENTS

Figure 1:
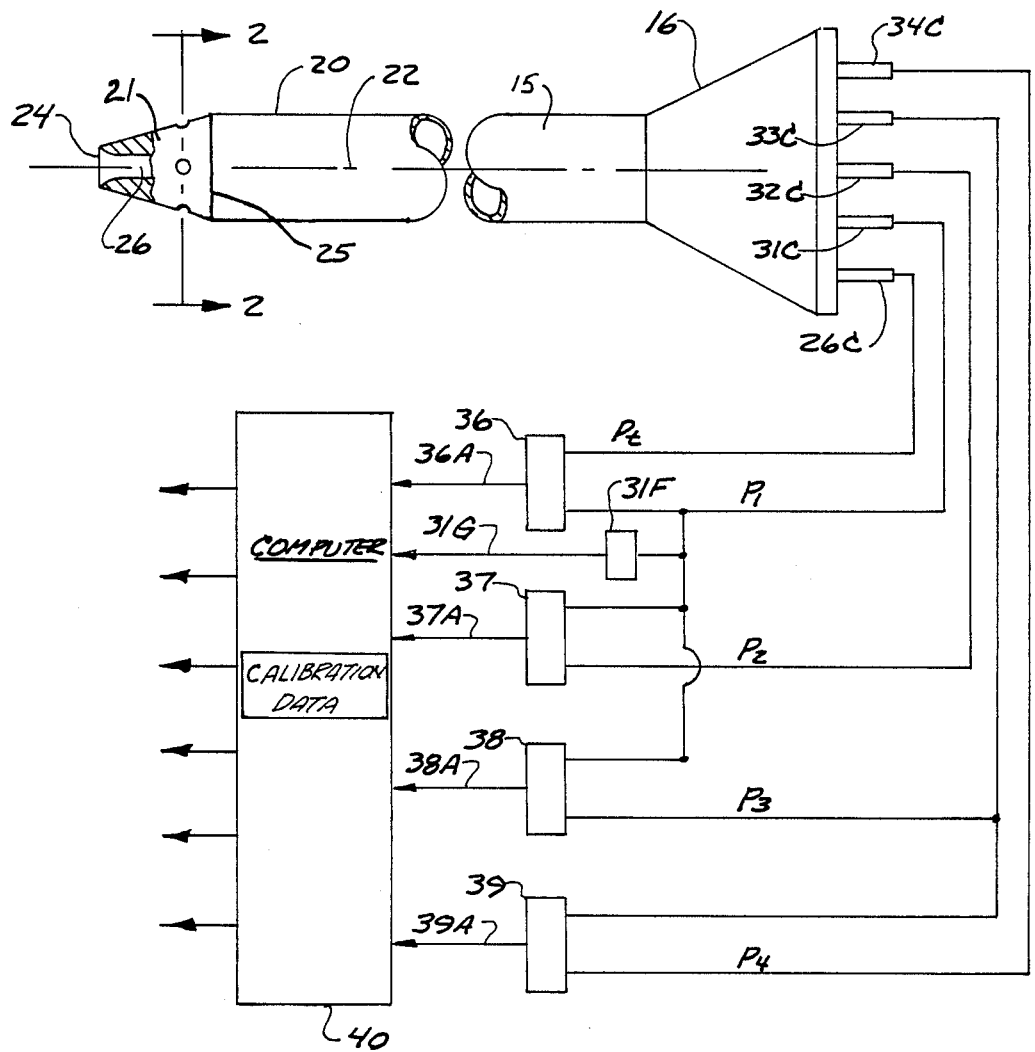
FIG. 1. is a plan view of a typical strut mounted probe made, according to the present invention.

FIG. 1 illustrates a compact probe assembly indicated generally at 15 made according to the present invention that is adapted to be boom mounted including a mounting base 16 which mounts onto a nose of an air vehicle in a conventional manner. The base can be circular in cross section. The probe assembly 15 includes a probe tube or barrel 20 which, in the form shown in FIG. 1, is circular in cross section. The probe assembly 15 includes a leading tapered end section 21 merged into the probe barrel and preferably integral with the probe barrel. The end section 21 is elongated along its central longitudinal axis 22 of the barrel 20, with respect to its diameter as shown in FIG. 2. Stated another way, the leading end section 21 is tapered from a leading end round, sharped edge pitot port 24 back to a junction line 25 where the leading end section 21 merges with the main barrel portion 20. The axial length along the axis 22 of the leading end section 21 is greater than the radius of the barrel 20. The outer surface of the leading end section is tapered gently. The outer surface is generated about the central axis so that all cross sections passing through the central axis have shallow curves or substantially straight lines defining the periphery of the leading end section.

The pitot port 24, as was stated, has a sharp edge, and has a central passageway 26 joined thereto that extend through the barrel 20. A plurality of pressure sensing port means open through the surface of the tapered end portion 21, as shown in FIG. 2, and also in FIG. 1. These include a pressure sensing port 31, and a pressure sensing port 32 that is directly opposite from port 31 and centered on the same central axis 31A-32A as port 31. The leading end section 21 also has pressure sensing port 33, which has a central axis 33A which is 90° to the axis of ports 31 and 32. Pressure sensing port 34 has an axis 34A that is on the same axis as, and which faces oppositely from the pressure sensing port 33. Thus, the plane defined by the longitudinal axis 22 of the probe and the pressure sensing port axis 31A and 32A and the plane defined by longitudinal axis 22 and the pressure sensing port axis 33A-34A are mutually perpendicular. The planes form the Y and Z planes for measurement. Axis 31A-32A is the Z axis and axis 33A-34A is the Y axis. The longitudinal axis 22 is the X axis.

While single independent ports 31-34 are shown, the ports comprise port means that may have a number of small ports or openings that are centered about the respective axes, and oriented for symmetrical sensing to provide four individual pressures centered along the respective port axes as shown.

Each of these ports 31-34 open into a manifold assembly indicated generally at 35, that carries individual passageways 31B-34B, open to the corresponding parts, as well as having the central passageway 26 for the pitot pressure therein. These passageways end in output pressure signal carrying tubes indicated at 26C and 31C-34C in FIG. 1. The individual pressure signals which are indicated as $P_t$ for the pitot pressure and $P_1$, $P_2$, $P_3$ and $P_4$ for the individual pressures sensed at ports 31, 32, 33 and 34, respectively, are then provided to individual differential pressure sensors 36, 37, 38 and 39, respectively. The pressure sensor 36 provides an output that is equal to $P_t-P_1$; pressure sensor 37 provides an output $P_1-P_2$; pressure sensor 38 provides an output $P_1-P_3$ and the pressure sensor 39 provides an output $P_3-P_4$ An absolute pressure sensor 31F is provided to provide an output proportional to the value of $P_1$. These outputs are carried along lines 36A-39A and line 31G as electrical signals to an onboard air data computer indicated generally at 40. The computer 40 will provide outputs to the various control functions and indicators along output lines as illustrated for the various signals to be provided as will be more fully discussed. Computer 40 is a standard computer programmed to take various compensation tables from curves that are illustrated in FIGS. 9-14. The curves are calibration curves for the particular sensor and sensor location involved, and the computer will be programmed to provide the appropriate correction factor to the pressure outputs in a conventional manner.

FIG. 3 shows a modified sensor leading end section cross section 21A. The main barrel portion would have the same cross section. The leading end section 21A has pressure ports 41, 42, 43 and 44 therein, and these are arranged in oppositely facing pairs and are centered on axes 41A–44A, respectively, as previously explained. The manifold in this form of the invention, indicated generally at 45, has passageways 41B–44B for carrying the individual pressures, as well as the pitot pressure passageway 26 which would open to a pitot port 24 at the leading end of the probe in the same manner as that shown in FIG. 1. The pressures from this particular cross section probe also would be designated $P_1$–$P_4$, and correspond to the numbering 41–44. The non-circular cross section could be useful where the leading end portion 21 of the probe is desired to have different enhancements of pressure in one plane. The pitot pressure port would remain circular.

FIG. 4 illustrates a probe assembly 46 which has a square cross section barrel 47, and a pyramidal leading end section 48. That is, the leading end section has four sides that taper together toward the forward port 49. The tip is altered to form a circular pressure port 49, for sensing pitot pressure at its leading end. The pitot port 49 leads to a central passageway 50.

As shown in FIG. 5, the pyramidal cross section leading end section 48 has pressure sensing ports 51 and 52 which are directly opposite each other, and correspond to ports 31 and 32 in position, that is, they provide $P_1$ and $P_2$ pressures and also has ports 53 and 54, that face in opposite directions and which are centered on common axes that are perpendicular to the axes of the pressure sensing ports 51 and 52. The port axes are shown at 51A–54A. The ports (port means) shown at 51–54 open into a manifold assembly 55, which has the central passageway 50 and individual outer passageways indicated at 51C–54C for carrying the individual pressure signals from the ports 51–54.

While the forward tapered section and the barrel as shown in FIG. 5 have sharp corners, the corners can be rounded if desired for obtaining different flow characteristics. Likewise, the angle of the pyramid formed by the leading end section 48 with respect to the longitudinal axis 56 of the probe can be varied between about 10° and 30°. The leading end section 48 has straight lines of taper in cross section from the pitot port to the junction with the main barrel portion 46.

The individual ports in the FIG. 4 configuration would correspond to those ports $P_1$–$P_4$ illustrated in FIG. 1, as well as $P_T$ for the pitot pressure. The circular port 49 again is a sharp edge, conventional circular pitot pressure sensing port that provides reliable pressure signals at high angles of attack.

In FIG. 6, a cross section of the formed end of a typical probe assembly showing the installation of heaters and a different manifold assembly is illustrated. In this form, a probe 60 has an outer tubular shell 61 that is circular in cross section, and has a tapered leading end section 62 leading to a pitot pressure port 63. The probe has a main barrel 64. The tapered leading end section has a plurality of pressure sensing ports 7114 74 positioned around the leading end section as previously illustrated, and in this instance, a manifold assembly comprises a tubular portion 75 that is slipped inside the outer tube 64. The ports 71–74 open to individual manifold chambers. Between the outer surface of manifold assembly 75 and the inner surface of the outer shell 64, a heater wire indicated at 77 is wound. The heater is held in place with a filler material 76 between the heater wire coils. The heater portion 77A on the leading end portion 62 is wound more compactly.

The manifold assembly 75 includes a central tube 80 that leads to the pitot port 63 and is joined thereto with a small tube section 81 that transitions into the tube 80 in a suitable manner. Additionally, the tube 80 is used as a core on the interior of an outer manifold tube 83 that is concentric with the tube 80. Small radial walls 85 are provided to form the individual compartments or passageways 71C–74C that carry the pressure signals from their respective pressure sensing ports. The configurations shown in FIGS. 6 and 7 are illustrative of the type of arrangement that can be made for providing heaters and a central manifold assembly for carrying the sensed pressures. The leading end section is substantially elongated and the outer surface has a shallow curve (convex) from the pitot port to where the leading end section merges with the main probe barrel. The length of the leading end section is at least equal to one and one half times the radius (the minimum radial dimension if the probe is rectilinear in cross section) of the probe at the port location to have sufficient taper for the gently convex curved outer surface and the sharp edged pitot port.

Figure 8:
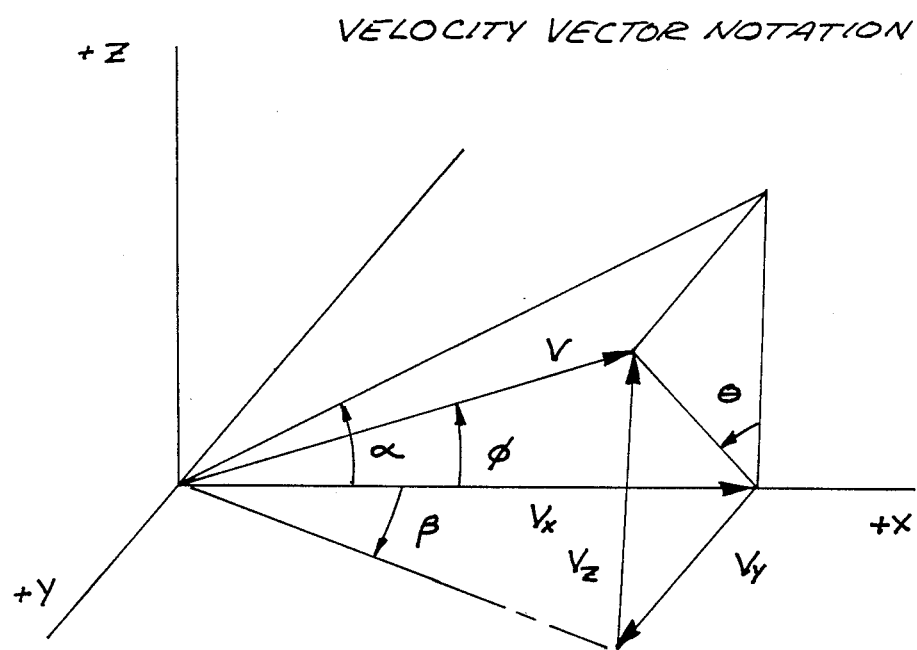
FIG. 8 is a graphical representation of the velocity vector notation for a typical probe made according to the present invention.
Figure 9:
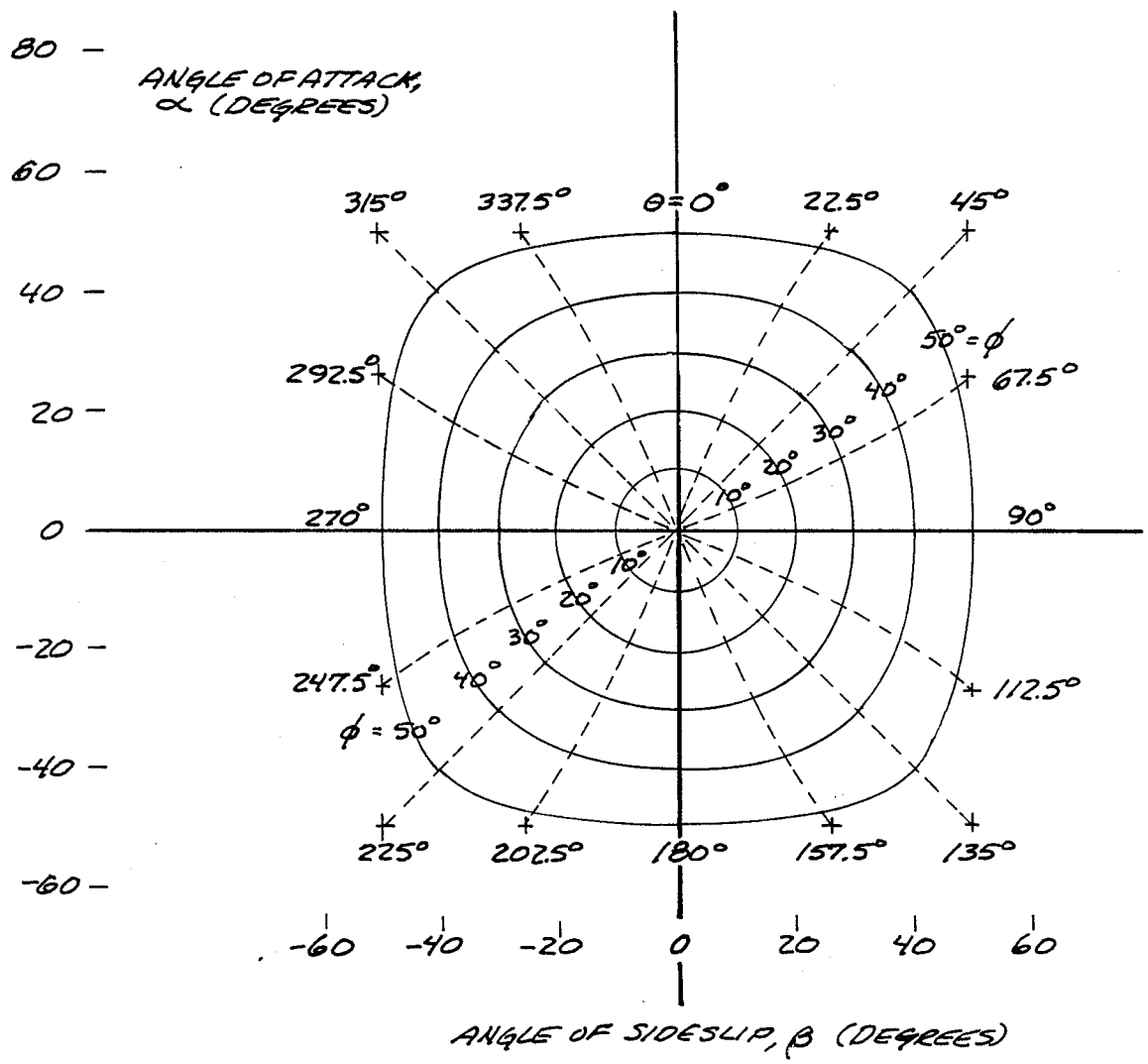
FIG. 9 is a graphic representation of the relationship of angle of attack and angle of sideslip to the resultant flow angle and rotational angle of the sensor probe, using the trigometric relationships shown in FIG. 8.
Figure 10:
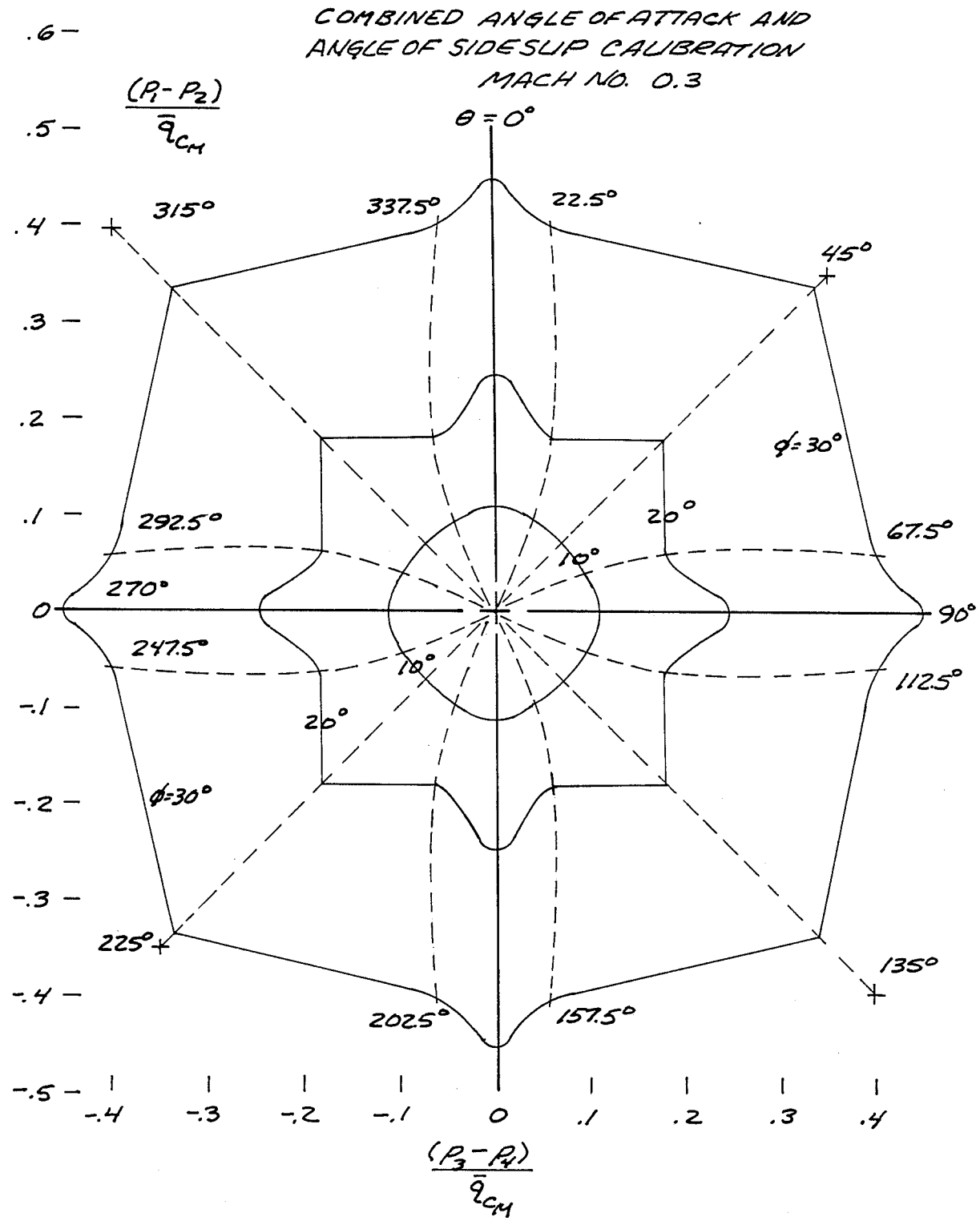
FIG. 10 is a graphical representation of combined angle of attack and angle of sideslip calibration for a typical probe using wind tunnel data at Mach 0.3 with a sensor made as shown in FIG. 1.

In operation, the vehicle can be traveling in an orientation so the longitudinal axis 22 or 56 of a typical probe is at a vector that is both rotated from what would be considered a normal Z plane, as well as operating at a combined angle of attack and angle of sideslip. FIG. 8 illustrates a velocity vector diagram showing the three axis coordinates, including the X axis, which would represent the axis 22, the axis 56 or the axis 81; and the Y axis, which would be represented by the axes 33A–34A; 43A–44A; and 53A–54A. These are the port axes perpendicular to the longitudinal axis of the probe. The Z axis is represented by the axes 31A–32A; 41A–42A; and 51A–52A. The velocity vector V is the resultant velocity flow vector. The designation $V_z$ is the velocity along the Z axis, and the designation $V_y$ is the velocity vector along the Y axis. The velocity $V_x$ is the velocity along the X axis.

It can be seen that in forming the velocity vector diagram, there is a resultant flow angle measured relative to the probe axis $\phi$ and there is also a vector rotational angle $\theta$. This angle $\theta$ is the rotational component relative to a plane defined by the X and Z axes.

The sensor described herein provides pressures from which air data parameters may be derived, including static pressure, impact pressure, angle of attack and angle of sideslip. Pressure altitude is derived from static pressure and calibrated airspeed is derived from impact pressure. Mach number is derived from the ratio of impact pressure to static pressure. The present sensor allows the determination of all of the above air data parameters using a minimum number of sensing ports by co-using pressures for the different functions. The pressures are inter-dependent and an iterative procedure can be used to obtain the final corrected air data parameters.

Angle of attack and angle of sideslip are defined by the schematic representation of a barrel or tube of FIG. 8. The X axis is assumed to be along the axis of the sensor and the resultant flow, velocity vector V, is inclined at a resultant flow angle $\phi$ measured with respect to the X axis. Angle of attack ($\alpha$) is the angle of the vector of the angle $\phi$, in the X-Z plane and angle of sideslip ($\beta$) is the angle of vector of the $\phi$ angle in the X-Y plane. Rotation of the velocity vector V about the X axis, measured relative to the X-Z plane is called the rotation angle $\theta$. Angle of attack and angle of sideslip are derived from $\phi$ and $\theta$ by the following equations: tan $\alpha$=tan $\phi$ cos $\theta$ and tan $\beta$=tan $\theta$sin $\theta$. The relationship between $\alpha$, $\beta$, $\phi$ and $\theta$ are illustrated on FIG. 9 for resultant angles from $\phi=0$ to $\phi=50°$ and rotational angles from $\theta=0°$ to $\theta=360°$.

Wind tunnel data for a sensor of the type shown in FIG. 1 with a circular cross section leading end (a conical taper) was obtained in wind tunnel tests at Mach number 0.3. Results are shown in FIGS. 10–14. One measured pressure signal $P_1$ and four pressure differentials $P_t$-$P_1$; $P_1$-$P_2$; $P_1$-$P_3$; and $P_3$-$P_4$ are the only measurements needed from the sensor.

The average measured static pressure is derived from the following relationship:

$$P_m = \frac{(P_1 + P_2 + P_3 + P_4)}{4} = \quad (1)$$

$$P_1 - \left[ \frac{(P_1 - P_2) + 2(P_1 - P_3) + (P_3 - P_4)}{4} \right]$$

The average measured impact pressure is derived from the relationship:

$$q_{cm} = (P_t - P_m) = (P_t - P_1) + \quad (2)$$

$$\left[ \frac{(P_1 - P_2) + 2(P_1 - P_3) + (P_3 - P_4)}{4} \right]$$

Angle of attack is derived from the ratio $(P_1-P_2)/\bar{q}_{cm}$ and angle of sideslip is derived from the ratio $(P_3-P_4)\bar{q}_{cm}$. Calibration of the angel of attack and angle of sideslip signals at Mach number 0.3 is given in FIG. 10. Data is shown over the full rotational angle ($\theta$), range from $\theta=0°$ to $\theta=360°$ for flow angles to $\phi=30°$. When the pressure ports are symmetrical as shown in FIG. 2, the pressure signals are symmetrical every 45°. The sign of $(P_1-P_2)$ and $(P_3-P_4)$ determine which quadrant the measurement is in. An expanded calibration of the $\alpha$ and $\beta$ signals is given in FIG. 11, which shows the relationship of $(P_1-P_2)/\bar{q}_{cm}$ and $(P_3-P_4)\bar{q}_{cm}$ cm to $\phi$ and $\theta$ over, the first quadrant. Calibration data is shown to $\phi=50°$. Data will be symmetrical for the other three quadrants with only the sign of $(P_1-P_2)$ and $(P_3-P_4)$ changing to show the correct quadrant.

Figure 11:
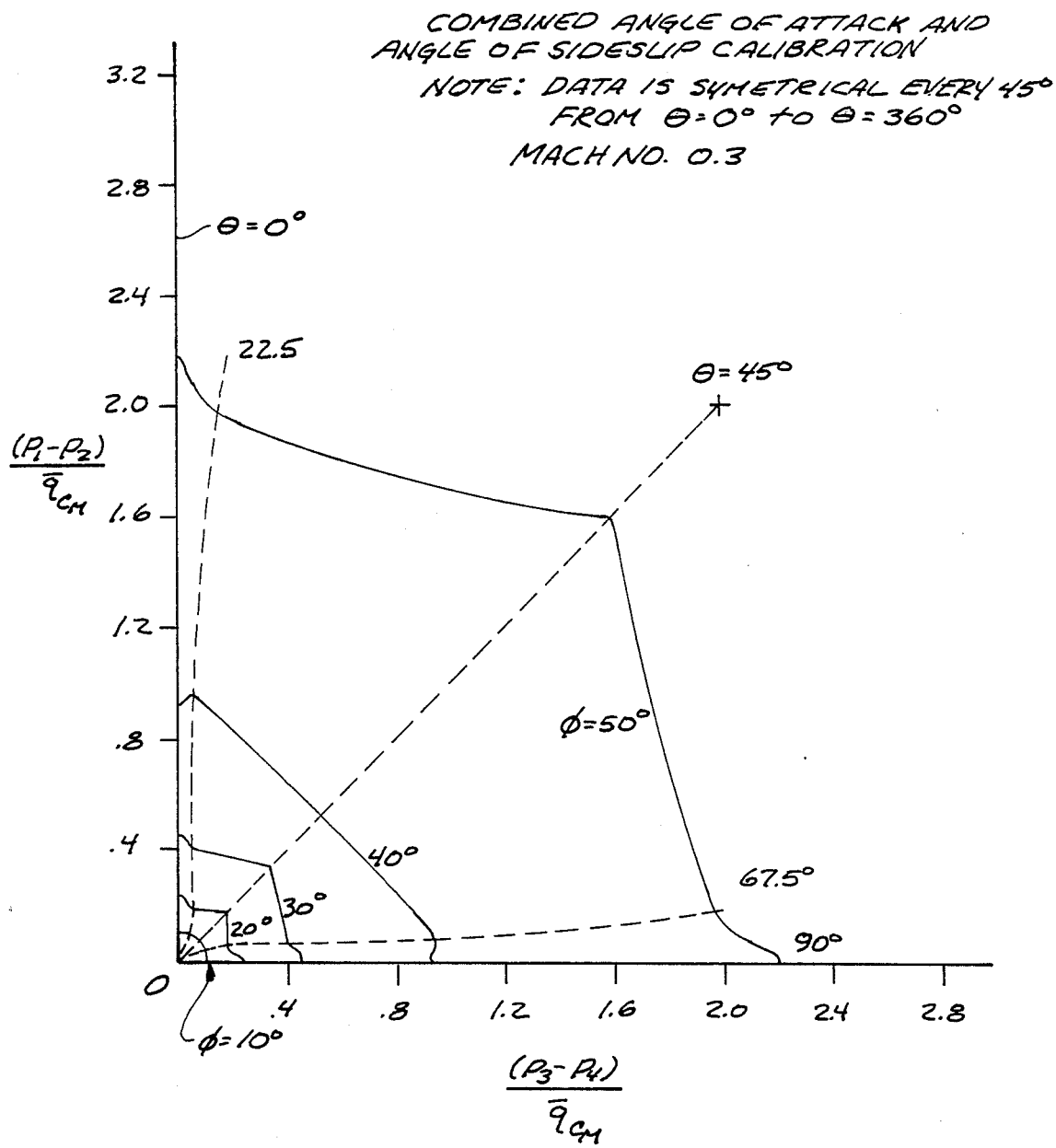
FIG. 11 is a graphical representation of one quadrant of combined angle of attack and angle of sideslip similar to FIG. 10 but up to a resultant flow angle of 50°.

FIG. 11 is greatly simplified for normal flight operation when angle of sideslip is zero. The pressure differential $(P_3-P_4)$ is zero and angle of attack ($\alpha$) is the same as the resultant flow angle ($\phi$), i.e. rotational angle $\theta$ is either 0° or 180° depending on the sign of $(P_1-P_2)$ Calibration data on FIGS. 10 and 11 would then fall on only one vertical line.

Figure 12:
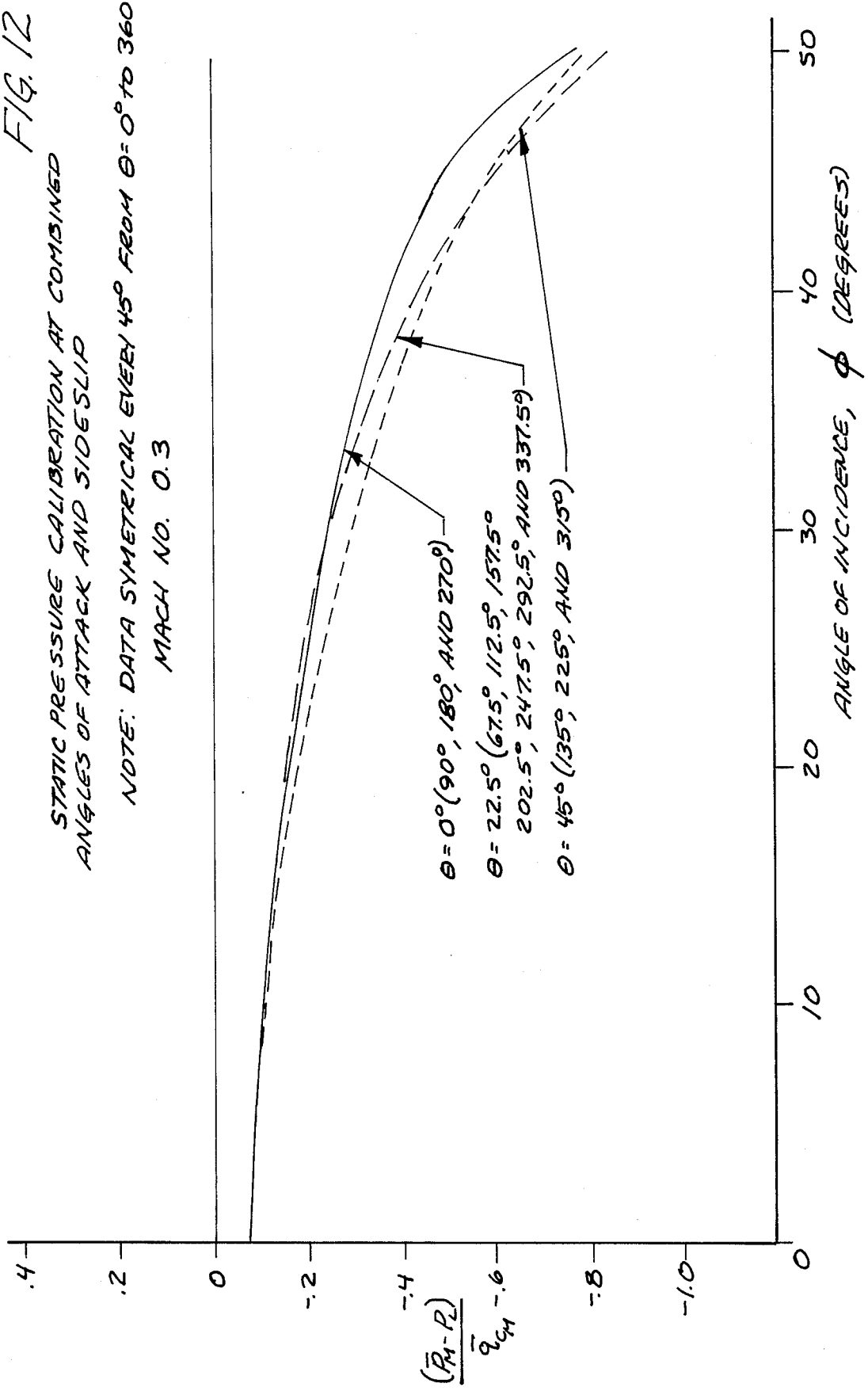
FIG. 12 is a graphical representation of a static pressure calibration at various combined angles of attack and sideslip using wind tunnel data at Mach 0.3 and a sensor made as shown in FIG. 1.

Static pressure calibration of the sensor of the present invention is given in FIG. 12. The pressure ratio $(\bar{P}_m-P_L)/\bar{q}_{cm}$ is plotted as a function of flow incidence ($\phi$) for lines of constant rotational angle ($\theta$). Because of symmetry of the probe, the data at $\theta=0°$ is also the same for $\theta=90°$, 180° and 270°. Data at $\theta=22.5°$ is also data for $\theta=67.5°$; 112.5°; 157.5°; 202.5°; 247.5°; 292.5° and 37.5°. Data at $\theta=45°$ is also data for 135°, 225° and 315°.

The static pressure calibration shown on FIG. 12 gives a correction to obtain the local static pressure $P_L$ on the aircraft at the mounting location of the compact sensor of the present invention. Local static pressure can be corrected to true static pressure by conventional aerodynamic compensation methods and/or by computional methods using the final corrected pressure outputs from the compact sensor, i.e. $P_L$, $q_{cL}$, $\alpha_L$ and $\beta_L$ where the subscript "L" designates local condition at the mounting location on the air vehicle. Impact pressure calibration for the compact sensor is given on FIG. 13. The pressure coefficient $(\bar{q}_{cm}-q_{cL}/\bar{q}_{cm}$ is shown as a function of the flow incidence angle ($\phi$) for lines of constant rotational angles ($\theta$). The data is also symmetrical every 45°, as described above for static pressure, and can be used over the full rotational range from $\theta=0°$ to 360°.

The method of deriving the air data parameters is as follows:

1. Measure the following pressures sensed by the ports on the probe:
   Absolute pressure: $P_1$ (sensor 31F)
   Differential pressures: $(P_t-P_1)$, $(P_1-P_2)$, $(P_1-P_3)$ $(P_3-P_4)$(from sensors 36–39).

2. Determine pressure $\bar{P}_m$ which is the average of the four pressures $P_1$, $P_2$, $P_3$ and $P_4$ from equation (1):

$$P_m = \frac{(P_1 + P_2 + P_3 + P_4)}{4} =$$

$$P_1 - \left[ \frac{(P_1 - P_2) + 2(P_1 - P_3) + (P_3 - P_4)}{4} \right]$$

3. Determine the average impact pressure $\bar{q}_{cm}$:

$$q_{cm} = (P_t - P_m) = (P_t - P_1) +$$

$$\left[ \frac{(P_1 - P_2) + 2(P_1 - P_3) + (P_3 - P_4)}{4} \right]$$

4. Calculate the angle of attack ratio:

$$\frac{(P_1 - P_2)}{q_{cm}}$$

and angle of sideslip ratio:

$$\frac{(P_3 - P_4)}{q_{cm}}$$

This is done in the air data computer using normal mathematical functions.

5. Use FIG. 11 compensation information from calibration curves of the computer with $(P_1-P_2)/\bar{q}_{cm}$ and $(P_3-P_4)/\bar{q}HD$ cm to find $\phi$ and $\theta$.

6. Solve for sensor angle of attack and angle of sideslip using the equations previously discussed and illustrated in FIG. 8.
   $\alpha$=arc tan (tan $\phi$ cos $\theta$)
   $\beta$=arc tan (tan $\phi$ sin $\theta$)

7. Solve for local static pressure at sensor mounting location:

$$P_L' = P_m - \left( \frac{P_m - P_L}{q_{cm}} \right)(q_{cm})$$

-continued where $$\frac{P_m - P_L}{q_{cm}}$$

is obtained from FIG. 12 at known values of $\phi$ and $\theta$.

Figure 13:
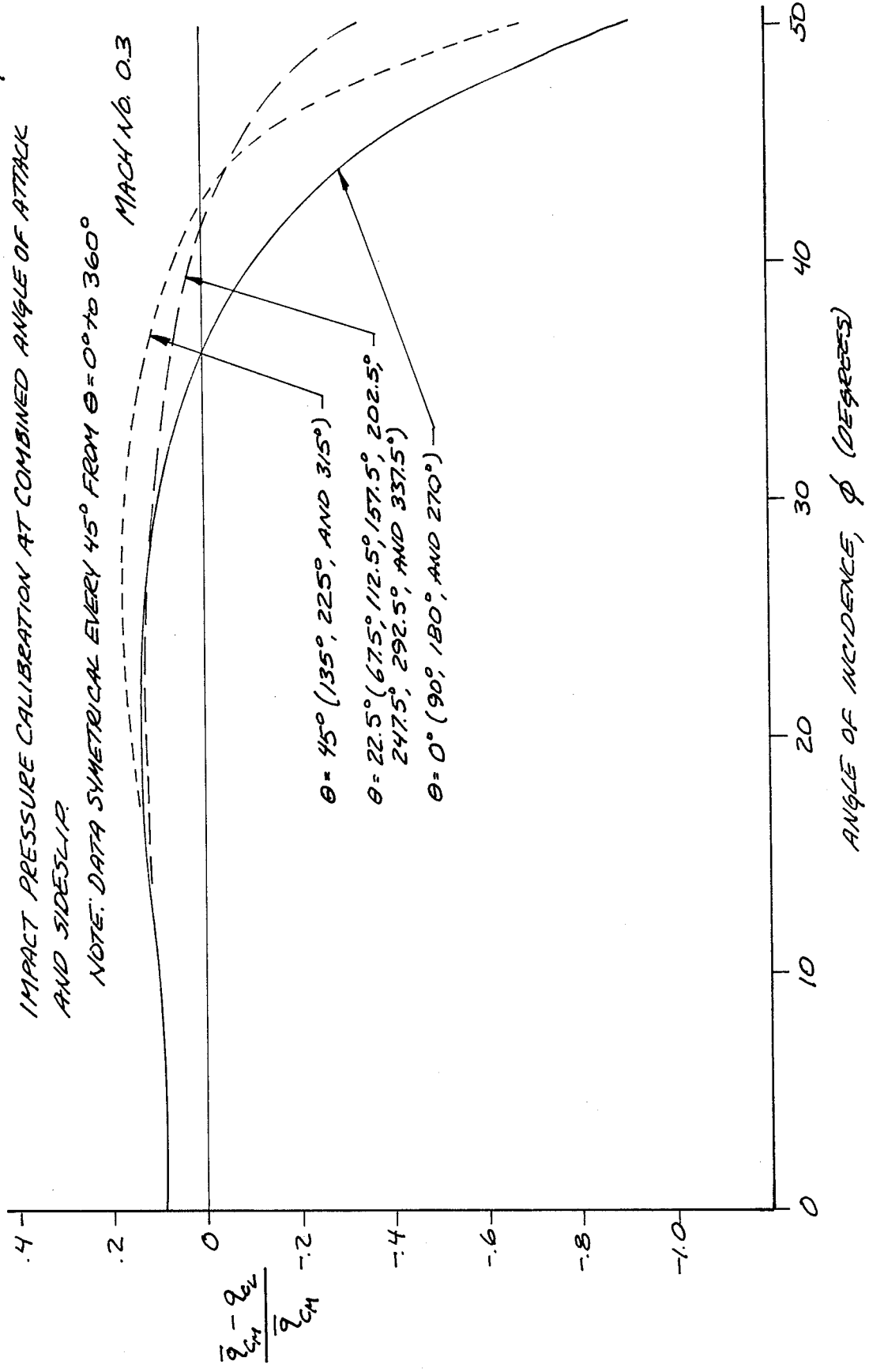
FIG. 13 is a graphical representation of impact pressure calibration at combined angles of attack and sideslip utilizing wind tunnel data at Mach 0.3 for a sensor made according to FIG. 1.

8. Solve for local impact pressure at sensor mounting location:

$$q_{cL} = q_{cm} - \left(\frac{q_{cm} - q_{cL}}{q_{cm}}\right)(q_{cm})$$

where $$\frac{q_{cm} - q_{cL}}{q_{cm}}$$

is obtained from the calibration information derived from the curves of FIG. 13, which information is stored in computer 40, at known values of $\phi$ and $\theta$, and the computer provides the calibration information in an on-line situation.

The above procedure can be fully computerized to solve for $\alpha$, $\beta$, $P_L$ and $q_{cL}$ from the measured pressures $P_1$, $(P_t-P_1)$, $(P_1-P_2)$, $(P_3-P_4)$ and $(P_1-P_3)$. The information or calibration data from graphs shown in FIGS. 11, 12 and 13 can be stored in the computer as two-dimensional arrays.

In the general case there will be some secondary dependency on Mach number for the parameters shown on FIGS. 11, 12 and 13. If a significant dependency exists, separate calibration data from graphs will be needed at reasonable increments of Mach number across the operable air speed range of the aircraft. The calibration information in the graphs can also be stored as three dimension arrays in a computer for fully computerized determination of $\alpha$, $\beta$, $P_L$ and $q_{cL}$.

If a Mach number dependency is significant, the following iterative data reduction procedure can be used:

(1a) Same as step (1) above
(2a) Same as step (2) above
(3a) Same as step (3) above
(4a) Same as step (4) above
(5a) Use FIG. 11 calibration data with $(P_1-P_2)/\bar{q}_{cm}$ and $(P_3-P_4)/\bar{q}_{cm}$ to find the first approximation of $\phi$ and $\theta$, called $\phi_A$ and $\theta_A$
(5b) Find approximate Mach number $M_A$ from $\bar{q}_{cm}$ and $\bar{P}_m$ and equation:

$$\frac{q_{cm} + P_m}{P_m} = 1 + \left(\frac{M_A^2}{5}\right)^{3.5}$$

(5c) Use approximate values of $\phi_A$ and $\theta_A$ at approximate Mach number $M_A$ with FIGS. 12 and 13 at the same Mach number to find approximate values of $(P_L)_A$ and $(q_{cL})_A$
(5d) Solve for approximate local Mach number $(M_L)_A$ from values of $(P_L)_A$ and $(q_{cL})_A$ $$\frac{(q_{cL})_A + (P_L)_A}{(P_L)_A} = \left(1 + \frac{(M_L)_A^2}{5}\right)^{3.5}$$

(5e) At approximate local Mach number $(M_L)_A$, select a calibration curve and the calibration information like FIG. 11 that is at, the same Mach number. Find the correct values of $\phi$ and $\theta$ (6a) Same as step (6) above
(7a) Same as step (7) above, use FIG. 12 calibration data at approximate local Mach number $(M_L)_A$ to find correct local static pressure $P_L$
(8a) Same as step (8) above, use FIG. 13 calibration data at approximate local Mach number $(M_L)_A$ to find correct local impact pressure $q_{cL}$.
(9a) Use the correct values of $P_L$ and $q_{cL}$ to find the correct value of local Mach number $(M_L)$:

$$\frac{q_{cL} + P_L}{P_L} = \left(1 + \frac{M_L^2}{5}\right)^{3.5}$$

(10a) Depending on the severity of the Mach number dependency of the calibration data shown in FIGS. 11, 12 and 13, it might be necessary to do additional iterative steps to arrive at the correct local Mach number $M_L$. However, the entire process can be programmed on computer 40 for continuous updating of the calculated air data parameters during actual in flight operational use. Programming carrying out the same correction is now done for existing air data sensor probes.

It is also possible to use additional ports in the present sensor, in addition to $P_1$, $P_2$, $P_3$ and $P_4$, to measure static pressure $P_m$. These auxiliary ports would not necessarily have to be on the same cross section as the points shown, but could be displaced slightly fore and aft along the axis of the sensor. A clearance area can be provided between the manifold assembly and the electrical heater, as illustrated on FIG. 6, to allow for a static pressure chamber into which to vent static ports.

In the special case where the sensor is symmetrical and enough static ports are added to make the measured static pressure symmetrical with $\theta$, then only one calibration line is needed for all $\theta$'s on FIG. 12 for $(P_m-P_L)/q_{cm}$ and on FIG. 13 for $(q_{cm}-P_{cL})/q_{cm}$. This will simplify the data reduction procedure by the fact that Pm and qm are measured directly, equations 1 and 2, and allow the elimination of pressure differential $(P_1-P_3)$.

The above data reduction procedure is for the general case where the sensor is boom mounted and subjected to both angle of attack and angle of sideslip flow conditions. For a simplified case where the sensor is strut mounted on the side of the fuselage, the flow rotation angle $\theta$ is zero and the sensor calibration will follow the $\theta=0°$ curves on FIGS. 11, 12 and 13. The angle of sideslip pressure ports ($P_3$ and $P_4$) are not needed and, if not used, the measured static pressure $\bar{P}_m$ would be the average of only pressures $P_1$ and $P_2$.

$$P_m = P_1 - \frac{(P_1 - P_2)}{2}$$

$$q_{cm} = (P_t - P_1) + \frac{(P_1 - P_2)}{2}$$

Figure 14:
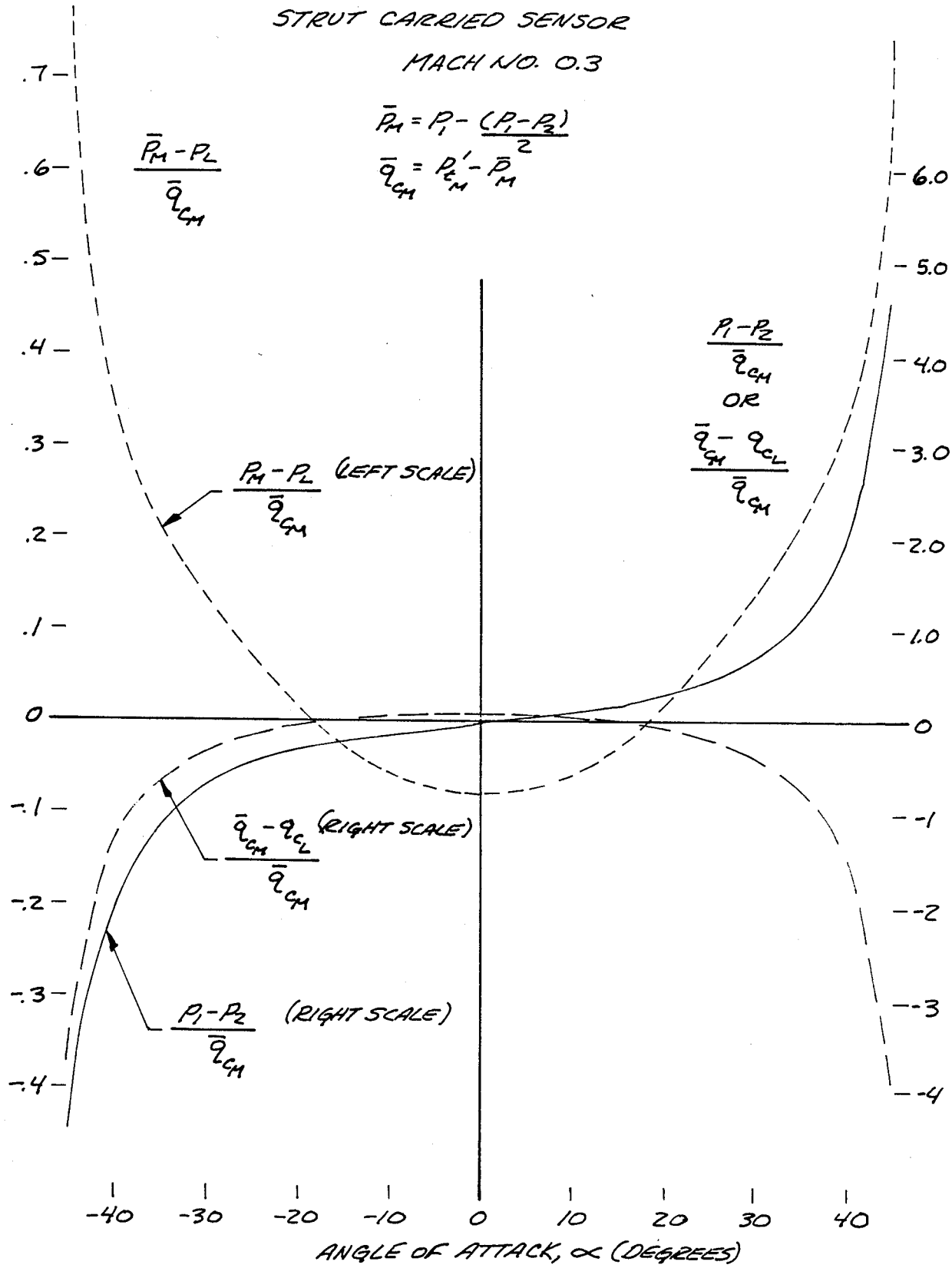
FIG. 14 is a graphical representation of the calibration for a fuselage mounted, strut-carried air data sensor made as shown in FIG. 1 using wind tunnel data at Mach 0.3.

The data reduction steps would be the same as for the general case above except, the data parameters for FIGS. 11, 12 and 13 would be replaced with parameters as a function of local angle of attack $\alpha_L$ as shown in FIG. 14.

For the strut mounted sensor it is also possible to use additional pressure ports, in addition to $P_1$ and $P_2$, to measure static pressure $P_m$. These ports would not necessarily have to be in the same cross section, but could be displaced slightly fore and aft along the axis of the sensor.

In its preferred form, the leading end section of the probe has an axial length greater than one radius of the main barrel (preferably at least $1\frac{1}{2}$ times the radius) but generally is not more than eight equivalent radii taken an a plane defined by the angle sensing port axes (meaning at the angle sensing port location). The sensing ports are positioned greater than one and less than six equivalent radii at the angle sensing port location aft of the pitot tip.

Although the present invention has been described with reference to preferred embodiments, workers skilled in the art will recognize that changes may be made in form and detail without departing from the spirit and scope of the invention.

What is claimed is:

1. A longitudinally shortened pressure sensing probe comprising a barrel having first and second ends, means for supporting the second end of said barrel relative to an air vehicle in a desired orientation, said barrel having a longitudinal axis, and the first end of said barrel having a tapered leading end section, said tapered leading end section being generated about said longitudinal axis and extending for an axial length of not substantially greater than six times the minimum lateral dimension of a main part of said barrel downstream of the tapered leading end section measured perpendicular to said longitudinal axis;
   a pitot port defined in the barrel and opening at a leading end of the tapered leading end section, said pitot port being defined by surface means extending at an angle with respect to the longitudinal axis to form a sharp peripheral edge on the pitot port, the surface tapering toward the axis in downstream direction;
   a plurality of port means formed through the tapered leading end section ahead of the junction of the tapered leading end section and the main part of the barrel, said port means comprising at least two oppositely facing ports means that are centered on axes perpendicular to the longitudinal axis of the barrel, with the port means sensing pressures on opposite sides of the barrel, the common axis being oriented in a desired manner when the barrel is mounted on an air vehicle; and
   said leading end section comprising an enclosing surface formed so that cross sections taken through the longitudinal axis show the enclosing surface to have a longitudinal axial length of at least $1\frac{1}{2}$ times the minimum radial dimension at the location of the port means and to smoothly expand throughout the longitudinal length of the tapered leading end section.

2. The probe of claim 1 wherein said axis of the port means lie on a common plane that is perpendicular to the longitudinal axis.

3. The probe of claim 1 wherein said port means comprise four port means, arranged in oppositely facing pairs, the first having central axes that intersect the longitudinal axis and wherein the port means of each pair of oppositely facing port means are centered on a common axis substantially perpendicular to the axis of the other pair of port means.

4. The probe of claim 3 wherein the axial spacing of the axis of said port means where the axis of the port means intersect the longitudinal axis of the probe is spaced a distance greater than 1 and less than 6 equivalent radius of the probe at the port means location rearwardly of the pitot port of the probe.

5. An air data sensing probe for determining air data parameters relative to the direction of fluid moving past the probe comprising an elongated probe barrel having a longitudinal axis, a first end of said barrel comprising a leading end with respect to the direction of fluid flow and comprising a tapered leading end section tapering to smaller size than a main part of the probe barrel in direction facing the fluid flow, said tapering section extending a relatively short length, but greater than one equivalent radius of the main part of the probe barrel and said tapered leading end section defining a circular pitot port facing in the direction of fluid flow and centered on the longitudinal axis;
   a plurality of port means formed through the probe barrel on the tapered leading end section, said port means being arranged in at least two pairs with each of the port means in each pair facing in an opposite direction and generally centered along a common axis passing through the longitudinal axis of the probe barrel;
   a manifold assembly mounted within said probe barrel and having a central passageway therethrough in fluid communication with the pitot port, and having a separate longitudinally extending passageway aligned with and opening to each of the port means to carry the pressure sensed by the respective port means to a second end of the barrel, said passageways each being fluidly isolated from the other passageways; and
   means for providing signals representative of the pressures at each of said pitot port and said port means, including means for providing a signal representing differential in pressure between selected port means for providing outputs from the probe.

6. The air data sensor of claim 5 wherein there are four port means, each of the port means facing opposite from another of the port means so that the port means are arranged in pairs, each pair being aligned along a common pair axis, each pair axis being perpendicular to the longitudinal axis and at 90 degrees to the axis of the other pair axis, the pitot pressure being designated pt, the pressures in a first pair of port means comprising oppositely facing port means being designated $p_1$ and $p_2$, and the pressure in the second pair of port means being designated $p_3$ and $p_4$, and differential pressure sensing means coupled to the port means for providing outputs substantially equal to the quantities $p_t-p_1$; $p_1-p_2$; $p_3-p_4$; and $p_1-p_3$.

7. The air data sensor of claim 6 and computer means for combining the outputs of said pressure sensors, and a signal that is a function of $p_t$, to provide an angle of attack, angle of sideslip, static pressure, and impact pressure without any substantial additional ports on the probe.

8. The air data sensor of claim 6 wherein said axis of a first pair of ports is oriented to be generally in the plane in which angle of attack is measured for an air vehicle on which the probe is mounted.

9. The air data sensor specified in claim 6 wherein said probe is adapted to be mounted ahead of an air vehicle.

10. The air data sensor from claim 9 wherein the two pairs of port means have central axes lying in a common plane perpendicular to the longitudinal axis of the barrel, and said common plane being positioned from the leading end toward the second end of the sensor barrel not substantially greater than six equivalent radii of the sensor at the port means location, and wherein said barrel has circular cross section.

11. The air data sensor of claim 6 wherein said barrel comprises a rectilinear cross section barrel and the leading end has substantially planar surfaces which form a junction line with the main portion of the barrel forwardly and the leading end section having a rounded tip to form a circular pitot port at the leading end of the barrel.

12. The air data sensor of claim 6 wherein the leading end section of the barrel is non-circular in cross section and has a greater width in direction along one of the pair axis than along the other pair axis.

13. The air data sensor of claim 6 wherein the leading end section is formed by a surface tapering toward the pitot port which surface forms substantially straight lines in longitudinal cross sections along the longitudinal axis.

14. The air data sensor of claim 13 wherein the longitudinal length of the leading end section is less than a distance equal to six equivalent radii of the sensor at the port means location.

15. The air data sensor of claim 6 wherein the leading end section is formed by an external surface that gently tapers from the main port of the probe barrel to the pitot port and is in the form of a shallow convex curve.

16. The air data sensor of claim 5 wherein said pitot port is defined by a surface formed symmetrically about an axis, and which tapers from an outer sharp edge where it intersects the tapered section of the barrel at the leading end in direction toward the longitudinal axis to where the surface means intersects the central passageway of the manifold assembly.

17. The apparatus of claim 5 wherein said manifold assembly comprises a first central longitudinally extending tube, said tube being open to said pitot port and being centered on the longitudinal axis, and a second outer tube surrounding said first tube that is of larger diameter than the first tube, and a plurality of radially extending walls joined to the first central tube and the second outer tube, said radial walls being arranged to provide said longitudinally extending passageways between the first central tube and the second outer tube of said manifold assembly.

18. In an air data sensing probe for determining air data parameters relative to the direction of fluid moving past the probe and having an elongated probe barrel with a longitudinal axis, a first end of said barrel comprising a leading end with respect to the direction of fluid flow and defining a circular pitot port facing in the direction of fluid flow and centered on the longitudinal axis, and a plurality of port means formed through the probe barrel having axes at annularly spaced radial positions, the improvement comprising:

a pressure carrying manifold assembly mounted within said probe barrel comprising first means defining an outer surface that fits within the probe barrel, and second means formed as part of the manifold assembly defining separate longitudinally extending passageways annularly aligned with and opening to each of the pitot port and the port means to carry the pressure sensed by the respective pitot port and the port means to a second end of the barrel, said passageways each being fluidly isolated from the other passageways.

19. The apparatus of claim 18 wherein the manifold assembly includes a central tube opening to the pitot port and supporting the second means.

20. The apparatus of claim 18 and a deicing heater surrounding the manifold assembly for deicing the probe barrel.

21. The apparatus of claim 18 wherein the second means comprising wall means extending generally radially from a center passageway.

* * * * *

UNITED STATES PATENT AND TRADEMARK OFFICE
CERTIFICATE OF CORRECTION

PATENT NO. : 4,836,019

DATED : June 6, 1989

INVENTOR(S) : Hagen et al.

It is certified that error appears in the above-identified patent and that said Letters Patent is hereby corrected as shown below:

In the Abstract, line 10, delete "utilizied" and insert --utilized--.

Column 3, line 13, after "made" delete ",".

Column 3, line 18, after "leading" insert --end portion of the probe;--.

Column 5, line 64, delete "7114 74" and insert --71-74--.

Column 7, line 7, delete "=tan θ sin θ" and insert --=tan ø sin θ--.

Column 7, Equation 1, delete "$P_m$" and insert --$\bar{P}_m$--.

Column 7, Equation 2, delete "$q_{cm}$ and $P_m$" and insert --$\bar{q}_{cm}$ and $\bar{P}_m$--.

Column 7, line 41, delete "," at end of line.

Column 7, line 49, after "over" delete ",".

Column 7, line 57, after (P1-P2) insert --.--.

Column 7, line 67, delete "37.5°" and insert --337.5°--.

UNITED STATES PATENT AND TRADEMARK OFFICE
CERTIFICATE OF CORRECTION

PATENT NO. : 4,836,019

DATED : June 6, 1989

INVENTOR(S) : Hagen et al.

It is certified that error appears in the above-identified patent and that said Letters Patent is hereby corrected as shown below:

Column 8, lines 28-29, delete "$P_m$" and insert --$\bar{P}_m$--.

Column 8, lines 37-38, delete "$q_{cm}$" and insert --$\bar{q}_{cm}$--.

Column 8, line 45, delete "$q_{cm}$" and insert --$\bar{q}_{cm}$--.

Column 8, lines 52-53, delete "$q_{cm}$" and insert --$\bar{q}_{cm}$--.

Column 8, line 57, delete "$\bar{q}HD$" and insert --$\bar{q}_{cm}$--.

Column 8, lines 66-68, delete "$P_m$" (both occurrences) and insert --$\bar{P}_m$--.

Column 8, lines 66-68, delete "$q_{cm}$" (both occurrences) and insert --$\bar{q}_{cm}$--.

Column 9, line 5, delete "$P_m$" and insert --$\bar{P}_m$--.

Column 9, line 6, delete "$q_{cm}$" and insert --$\bar{q}_{cm}$--.

UNITED STATES PATENT AND TRADEMARK OFFICE
CERTIFICATE OF CORRECTION

PATENT NO. : 4,836,019

DATED : June 6, 1989

INVENTOR(S) : Hagen et al.

It is certified that error appears in the above-identified patent and that said Letters Patent is hereby corrected as shown below:

Column 9, lines 11-19, delete:

$$q_c L = q_{cm} - \left( \frac{q_{cM} - q_c L}{q_{cm}} \right) (q_{cm})$$

where $$\frac{q_{cm} - q_c L}{q_{cm}}$$

insert:

$$q_c L = \overline{q_{cm}} - \left( \frac{\overline{q_{cm}} - q_c L}{\overline{q_{cm}}} \right) (\overline{q_{cm}})$$

where $$\frac{\overline{q_{cm}} - q_c L}{\overline{q_{cm}}}$$

UNITED STATES PATENT AND TRADEMARK OFFICE
CERTIFICATE OF CORRECTION

PATENT NO. : 4,836,019

DATED : June 6, 1989

INVENTOR(S) : Hagen et al.

It is certified that error appears in the above-identified patent and that said Letters Patent is hereby corrected as shown below:

Column 9, lines 51-55, delete:

$$\frac{q_{cm}+Pm}{Pm} = 1+\left(\frac{M_A^2}{5}\right)^{3.5}$$

insert:

$$\frac{\overline{q_{cm}}+\overline{P_m}}{\overline{P_m}} = 1+\left(\frac{M^2{}_A}{5}\right)^{3.5}$$

Column 10, line 1, delete "at, and insert --at--.

Column 10, line 44, delete "Pm" and insert --$\bar{P}_m$--.

Column 10, line 44, delete "qm" and insert --$\bar{q}_m$--.

Column 10, lines 58-62, delete "$P_m$" and insert --$\bar{P}_m$--.

Column 10, lines 58-62, delete "$q_{cm}$" and insert --$\bar{q}_{cm}$--.

UNITED STATES PATENT AND TRADEMARK OFFICE
CERTIFICATE OF CORRECTION

PATENT NO. : 4,836,019

DATED : June 6, 1989

INVENTOR(S) : Hagen et al.

It is certified that error appears in the above-identified patent and that said Letters Patent is hereby corrected as shown below:

Column 11, line 11, delete "an" and insert --on--.

Signed and Sealed this

Fifteenth Day of October, 1991

*Attest:*

HARRY F. MANBECK, JR.

*Attesting Officer*      *Commissioner of Patents and Trademarks*